Patented July 26, 1927.

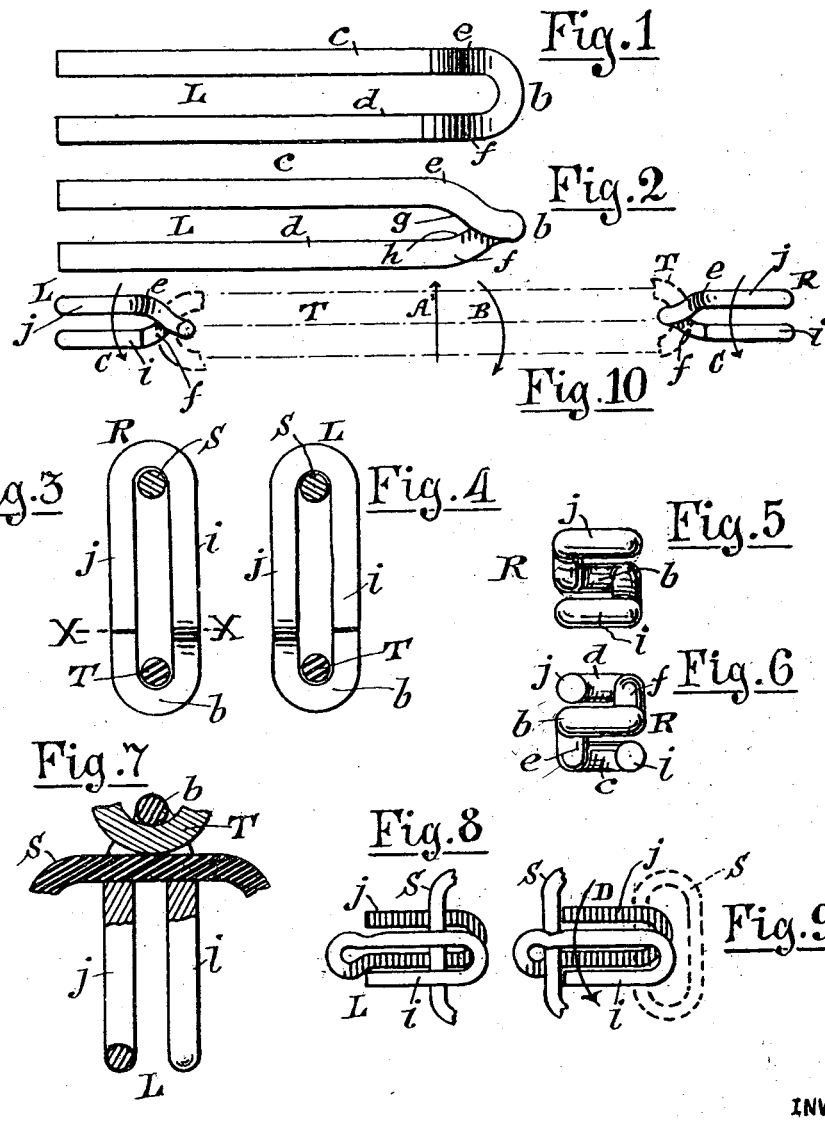

1,636,846

UNITED STATES PATENT OFFICE.

FRED BOND, OF MONTREAL, QUEBEC, CANADA, ASSIGNOR TO FRED BOND AND JOSEPH BOND, BOTH OF MONTREAL, CANADA.

NONSKID CHAIN FOR AUTOMOBILES.

Application filed May 19, 1926. Serial No. 110,169.

My invention relates more particularly to the attachment end links for fastening the cross-chains to the side chains and has for its object to provide self-locking links adapted to be carried by the cross chains and be connected and disconnected from the side chains without the use of pliers or other tools.

To this end my invention consists of a self-locking end link composed of a single piece of hardened wire folded on itself with its respective sides offset in opposite directions at right angles to the plane of the fold and in close proximity to the latter, each side of the wire being bent back on itself in a plane parallel to the plane of the fold to form a pair of oppositely facing elongated hooks lying in planes parallel to each other and to the plane of the fold, the bent back lengths of which extend parallel to each other and to both sides of the folded wire, and terminating at the beginning of the rise of the shoulders formed by the respective offsets, all the lengths or members of the link being spaced apart a distance substantially equal to the thickness of the wire.

Another object of my improved self-locking link is that the link on one end of a cross chain is the reverse of the link on the opposite end with the object of producing right and left end links which although the links cannot be accidentally unlocked under any circumstances, cause the traction power to more securely lock the links when the car is moving forwardly although when reversed the particular form and relative arrangement of the hooks while causing the initial unlocking movement to be made prevents the completion of the unlocking movement and maintains the lock.

Heretofore all end links have either been subject to displacement with consequent disconnection of cross chains from the side chains where these end links have purported to be self-locking, or have been so fastened that they have required considerable labor to disconnect in the event of a cross chain breaking and it being necessary to replace the same with an unbroken cross chain. As before stated my improved end link is self-locking to such an extent that vibration and disturbance of all kinds however severe cannot cause disconnection.

For full comprehension, however, of my invention reference must be had to the accompanying drawings in which similar reference characters indicate the same parts and wherein:

Figure 1 represents a length of wire folded upon itself and having its respective sides offset at right angles to the plane of the fold and in opposite directions suitable for a left hand link;

Figure 2 is a view of the folded offset wire taken at right angles to Figure 1;

Figures 3 and 4 illustrate right and left hand links respectively as viewed from the side presenting an unobstructed loop with closed ends;

Figures 5 and 6 are elevations of the opposite ends of a right hand link;

Figure 7 is a fragmentary view of a left hand link and illustrating particularly the relative position of the ends of the hooks to the fold of the wire to accommodate with a tight fit the end of a cross chain and one side of one of the links of the side chain, the long side of one of the hooks being in section and the ends of both hooks being broken away in the interest of clear illustration;

Figures 8 and 9 illustrate the relative positions of a left hand link and a side chain link to which it is now to be connected; and Figure 10 illustrates a cross chain with right and left hand links carried by its ends.

In the manufacture of my self-locking end link for non-skid chains for automobile tires, a length of hardened wire is folded upon itself as at $b$ to enclose a space slightly wider than the thickness of the wire of the cross chain links; and the respective sides $c$ and $d$ are offset as at $e$ and $f$ at right angles to the plane in which the fold $b$ lies. Thus spacing the sides obliquely to the plane of the fold a distance apart about two and a half times greater than the width of the space enclosed by the fold, and the ends of the hooks are similarly spaced. These offsets form oppositely extending shoulders $g$ and $h$ which contribute in a measure to the self-locking quality of the link by assisting in effecting the engagement of the link with the side chain. The portion of each side of the folded wire between its offset and end is bent back on itself as at $i$ and $j$ to bring their ends to a line $x$—$x$ Fig. 3, crossing the fold $b$ at a distance from the inner face of the fold slightly less than the combined thickness of the wires of the two links (side chain $s$ and cross chain $t$) locked together by my end-attachment link, as shown in Figure 7. Elongated hooks are thus formed, each enclosing a space approximating in width the diameter of the wire of the cross-chain links as shown in Figures 3 and 4, while the hooks are parallel and spaced a distance apart substantially the same as the thickness of the wire of the cross-chain links, as shown in Figure 10. The opposite ends of the link thus produced are shown in elevation in Figures 5 and 6. The structure of the link presents a working space for the links of the cross chain and side chain locked together thereby, and this space as shown in Figures 3 and 4 is of open unobstructed loop form with closed ends. This unobstructed loop affords freedom for movement of the side chain link from one end of the loop to contact with the cross chain link. The cross chain link, surrounding the wire of the fold, as shown in Figures 7 and 10, is with the end link of the side chain slightly larger in diameter than the space between the inner face of the fold $b$ and the ends of the hooks. In Figure 7 this is shown as clearly as it can be illustrated in a drawing. As a matter of fact the combined thickness of the two engaged links when being united must be forced slightly to pass this point, and therefore are prevented from accidental disconnection because of the retarding condition here. In Figure 10 a complete cross chain is shown with right and left end links attached. (The links being indicated respectively at L and R.)

The construction of my right and left links is such that the links must be so attached to ends of the cross-chain that the back of the hook $j$ will be towards the front of the car. This applied to both right and left links; and when the cross-chain is being attached to a side chain for use on the wheels at the left side of the car, the right hand link, $r$, must be located on the right hand side of the wheel. By this arrangement of my end links forward movement of the car impels the end links deeper into locking engagement. To secure them to the ends of a cross-chain one end of the end link of the cross chain is passed over one of the hooks and between it and the other hook of one of my end links. The thickness of the wire of the cross-chains commonly used is such that its end will pass between the hooks freely until it reaches the end of the hook it encloses. The space between the hook-end and the opposite offset is narrower than the diameter of wire of the cross-link and, in consequence, the hook-end must be sprung to let it pass. When the hook is sprung and the cross-link passes into the fold $b$ the resilience of the hook will return its end to its normal position where it blocks any tendency of the cross-link to come out. In order to attach with my self-locking link, a cross chain to a side chain, one of the hooks is passed through one of the links of the side chain (Figure 8) until the ends of both hooks clear that side of the side chain link (Figure 9). My attachment link is then turned to the left as shown at C in Figure 10 and D in Figure 9, which places the ends of the respective hooks at the opposite sides of the side of the side chain link.

The attachment link is then pulled towards the cross-chain thus engaging both hooks of the link with the side chain as indicated in dotted lines in Figure 9. This manner of attachment is followed for each cross-section of all four wheels, and the chains are then ready to perform their anti-skid function. The attachment link cannot be disengaged without pushing it through the link to which it is attached, and it must be pushed far enough through for the ends of the hooks to clear the side of the side chain link. The attachment link must then be turned in the reverse direction (D Figure 9) to that just described when it will be unlocked and may be disconnected. It is obvious that with the cross chain arranged as indicated in Figure 10, the traction power of the forwardly moving car indicated by arrow A transmitted through the tires of the traction wheels will tend to roll the cross chains in a direction contrary to the unlocking direction indicated by arrow B, thus making it physically impossible for the attachment links to be unlocked under such circumstances. When the car is reversed the tendency is to roll the cross chain in the opposite direction which is the initial unlocking movement. The effect is however that as the chain is rolled it is tightened and consequently shortened and it is impossible for the hook of either end link to, under the circumstances, enter the side chain a sufficient distance for the ends of the elongated hooks to clear the side of the side chain link engaged thereby. This same impediment is present when the car is going forward. Thus my improved attachment links cannot be unlocked accidentally under any circumstances. These attachment links are therefore self-locking in the truest sense of the word, and yet when a chain breaks, as frequently happens, my attachment links may be readily unlocked by simply pushing them into the side chains and giving them a quarter turn, the right-hand link to the left and the left-hand link to the right.

What I claim is as follows:

1. A self-locking connecting link for anti-skid chains for automobile tires consisting of a single piece of hardened wire folded on itself midway of its length, the respective sides of the wire being offset in opposite directions at right angles to the plane of the fold and in close proximity to the latter, each side of the wire being bent to elongated hook form and the ends of the hooks terminating at the offsets, said hooks being disposed in planes parallel to each other and to the plane of the fold and the bent back hook portions extending parallel to each other and to both sides of the folded wire, all portions of the link being spaced apart a distance substantially equal to the diameter of the wire of the largest link engaged.

2. A connecting link for connecting the cross-chain to the side chains of the non-skid chains for automobiles, such link consisting of a length of wire folded on itself midway of its length, and presenting a pair of elongated hooks each formed with a shoulder in close proximity to the end of its bent back portion and to the fold.

3. A connecting link consisting of a pair of hooks substantially permanently fixed in spaced parallel arrangement, connected together by an integral portion of the wire of the link the portions whereof which merge in the hooks being offset in close proximity to the end of the bent back portion of each hook, and the fold of the wire lying in a plane parallel to the planes of the hooks.

4. An attachment link for the purpose set forth consisting of a single piece of hardened wire presenting a pair of elongated hooks united by an integral folded part, the hooks and folded part being in parallel planes and the distance between the ends of the hooks and the inner surface of the folded part being slightly less than the combined diameters of the wires of the two links to be united thereby.

In testimony whereof I have signed my name to this specification.

FRED BOND.